United States Patent
Choi et al.

(10) Patent No.: US 9,013,431 B2
(45) Date of Patent: Apr. 21, 2015

(54) POWER-SAVING DISPLAY DEVICE

(71) Applicant: Samsung Display Co., Ltd., Yongin, Gyeonggi-Do (KR)

(72) Inventors: Byeong-Hwa Choi, Yongin (KR); Seung-Bae Lee, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 94 days.

(21) Appl. No.: 13/942,424

(22) Filed: Jul. 15, 2013

(65) Prior Publication Data

US 2014/0292672 A1 Oct. 2, 2014

(30) Foreign Application Priority Data

Apr. 2, 2013 (KR) .................. 10-2013-0035956

(51) Int. Cl.
*G09G 5/00* (2006.01)
*G06F 3/041* (2006.01)

(52) U.S. Cl.
CPC ..................................... *G06F 3/041* (2013.01)

(58) Field of Classification Search
CPC ....... G06F 3/041; G06F 3/0412; G06F 3/044; G06F 3/04847; G06F 1/1652; G02F 1/061; G02F 1/1303
USPC ..................................... 345/173, 174; 349/12
See application file for complete search history.

(56) References Cited

U.S. PATENT DOCUMENTS

| | | | | |
|---|---|---|---|---|
| 7,184,045 B2* | 2/2007 | Hidai | .............................. | 345/441 |
| 8,675,064 B2* | 3/2014 | Maruyama et al. | ............ | 348/143 |
| 2005/0176470 A1* | 8/2005 | Yamakawa | ..................... | 455/566 |
| 2008/0204426 A1* | 8/2008 | Hotelling et al. | ............. | 345/173 |
| 2008/0225014 A1* | 9/2008 | Kim | .............................. | 345/173 |
| 2009/0267870 A1* | 10/2009 | Schellingerhout et al. | ..... | 345/55 |
| 2010/0033435 A1* | 2/2010 | Huitema | ........................ | 345/173 |
| 2010/0088653 A1* | 4/2010 | Yach et al. | ..................... | 715/863 |
| 2010/0164973 A1* | 7/2010 | Huitema et al. | .............. | 345/581 |
| 2010/0194785 A1* | 8/2010 | Huitema et al. | .............. | 345/690 |
| 2012/0032972 A1* | 2/2012 | Hwang | ......................... | 345/592 |
| 2012/0218206 A1* | 8/2012 | Sato et al. | ...................... | 345/173 |
| 2013/0147731 A1* | 6/2013 | Adachi | .......................... | 345/173 |
| 2013/0187875 A1* | 7/2013 | Matsuoka et al. | ............. | 345/173 |
| 2013/0222416 A1* | 8/2013 | Kim et al. | ...................... | 345/619 |
| 2014/0015792 A1* | 1/2014 | Chen et al. | ..................... | 345/174 |

FOREIGN PATENT DOCUMENTS

| | | |
|---|---|---|
| JP | 2004-272835 A | 9/2004 |
| KR | 10-2010-0034578 | 4/2010 |
| KR | 10-2012-0014872 | 2/2012 |
| WO | WO 2012/020983 A2 | 2/2012 |

* cited by examiner

*Primary Examiner* — Tom Sheng

(74) *Attorney, Agent, or Firm* — Christie, Parker & Hale, LLP

(57) ABSTRACT

A display device includes a display panel including a plurality of first sensing lines that extend in a first direction, and a plurality of second sensing lines that extend in a second direction, a first position selector and a second position selector at an edge of the display panel, and spaced apart from each other in the first direction, and a third position selector and a fourth position selector at or above the display panel, and spaced apart from each other in the second direction, wherein an activated region of the display panel corresponds to respective positions of the first position selector, the second position selector, the third position selector, and the fourth position selector

22 Claims, 5 Drawing Sheets

POWER-SAVING DISPLAY DEVICE

CROSS-REFERENCE TO RELATED APPLICATION

This application claims priority to and the benefit of Korean Patent Application No. 10-2013-0035956, filed on Apr. 2, 2013 in the Korean Intellectual Property Office, the disclosure of which is incorporated herein in its entirety by reference.

BACKGROUND

1. Field

Embodiments of the present invention relate to a display device, and more particularly, to a power-saving display device with low power consumption.

2. Description of the Related Art

With the recent advancement of display technology, research is being carried out to develop flexible, bendable, or rollable displays.

For example, because organic light-emitting display panels exhibit wide viewing angles, high contrast ratios, short response times, and low power consumption, they are used in an increasingly wide range of applications from personal portable devices, such as MP3 players or mobile phones, to TVs. Furthermore, due to their self-emission characteristics, the organic light-emitting display panels do not require a separate light source, which may reduce the overall thickness and weight of the display panels.

Such display panels may be realized as a flexible or rollable display by using a plastic substrate, and may have an increased flexibility by reducing a thickness thereof. A flexible display may be used not only in a two-dimensional (2D) shape, but also in a 3D shape through deformation due to its flexibility.

SUMMARY

Embodiments of the present invention provide a power-saving display device designed to turn-on and display only a desired region of a panel.

According to an embodiment of the invention, there is provided a display device including a display panel including a plurality of first sensing lines that extend in a first direction, and a plurality of second sensing lines that extend in a second direction, a first position selector and a second position selector at an edge of the display panel, and spaced apart from each other in the first direction, and a third position selector and a fourth position selector at or above the display panel, and spaced apart from each other in the second direction, wherein an activated region of the display panel corresponds to respective positions of the first position selector, the second position selector, the third position selector, and the fourth position selector.

A length of the activated region in the first direction may correspond to a first position of the first position selector and a second position of the second position selector.

A length of the activated region in the second direction may correspond to a third position of the third position selector and a fourth position of the fourth position selector.

The first position selector and the second position selector may be each configured to select one of the second sensing lines, and may be respectively configured to determine an Xa coordinate and an Xb coordinate, the Xa and Xb coordinates corresponding to the first direction of the display panel, and the third position selector and the fourth position selector may be each configured to select one of the first sensing lines, and may be respectively configured to determine a Ya coordinate and a Yb coordinate, the Ya and Yb coordinates corresponding to the second direction of the display panel, and the activated region may correspond to pairs of the coordinates (Xa, Ya), (Xa, Yb), (Xb, Ya), and (Xb, Yb).

The first position selector and the second position selector may be movable in the first direction, and the third position selector and the fourth position selectors may be movable in the second direction.

The display panel may be flexible.

The first direction may be perpendicular to the second direction.

The first position selector, the second position selector, the third position selector, and the fourth position selector may each include a conductive material.

The plurality of first sensing lines and the plurality of second sensing lines may be configured to detect variations in capacitance.

A first movement member may be located at the edge of the display panel to guide movement of the first position selector and the second position selector.

According to another embodiment of the present invention, there is provided a display device including a display panel including a plurality of first sensing lines that extend in a first direction, and a plurality of second sensing lines that extend in a second direction, a first position selector and a second position selector at an edge of the display panel, and spaced apart from each other in the first direction, a third position selector and a fourth position selector at or above the display panel, and spaced apart from other in the second direction, a cylindrical jig configured to wind and unwind the display panel, and a housing in which the cylindrical jig is mounted, the housing defining a hole through which at least a portion of the display panel is configured to pass, wherein an activated region of the display panel corresponds to respective positions of the first position selector, the second position selector, the third position selector, and the fourth position selector.

The housing may include a second movement member for guiding movement of the third position selector and the fourth position selector in the second direction.

A length of the activated region in the first direction may correspond to a first position of the first position selector and a second position of the second position selector.

A length of the activated region in the second direction corresponds to a third position of the third position selector and a fourth position of the fourth position selector.

The first position selector and the second position selector may be configured to select one of the second sensing lines, and may be configured to respectively determine an Xa coordinate and an Xb coordinate corresponding to the first direction of the display panel, the third position selector and the fourth position selector may be configured to select one of the first sensing lines, and may be configured to respectively determine a Ya coordinate and a Yb coordinate corresponding to the second direction of the display panel, and the activated region may correspond to coordinate pairs (Xa, Ya), (Xa, Yb), (Xb, Ya), and (Xb, Yb) of the Xa, Xb, Ya, and Yb coordinates.

The first position selector and the second position selector may be movable in the first direction, and the third position selector and the fourth position selector may be movable in the second direction.

The first direction may be perpendicular to the second direction.

The first position selector, the second position selector, the third position selector, and the fourth position selector may each include a conductive material.

The plurality of first sensing lines and the plurality of second sensing lines may be configured to detect variations in capacitance.

A first movement member may be located at the edge of the display panel to guide the first position selector and the second position selector.

The first position selector and the second position selector may be ⊏-shaped, and may be located over a top surface and below a bottom surface of the display panel.

The third position selector and the fourth position selector may be cylindrically shaped.

The display device includes first through fourth position selectors configured to select a desired region on a display panel and turns on and displays only the selected region, thereby enabling low power consumption.

BRIEF DESCRIPTION OF THE DRAWINGS

The above and other aspects of embodiments of the present invention will become more apparent by describing in detail exemplary embodiments thereof with reference to the attached drawings in which.

DETAILED DESCRIPTION

Figure 1:
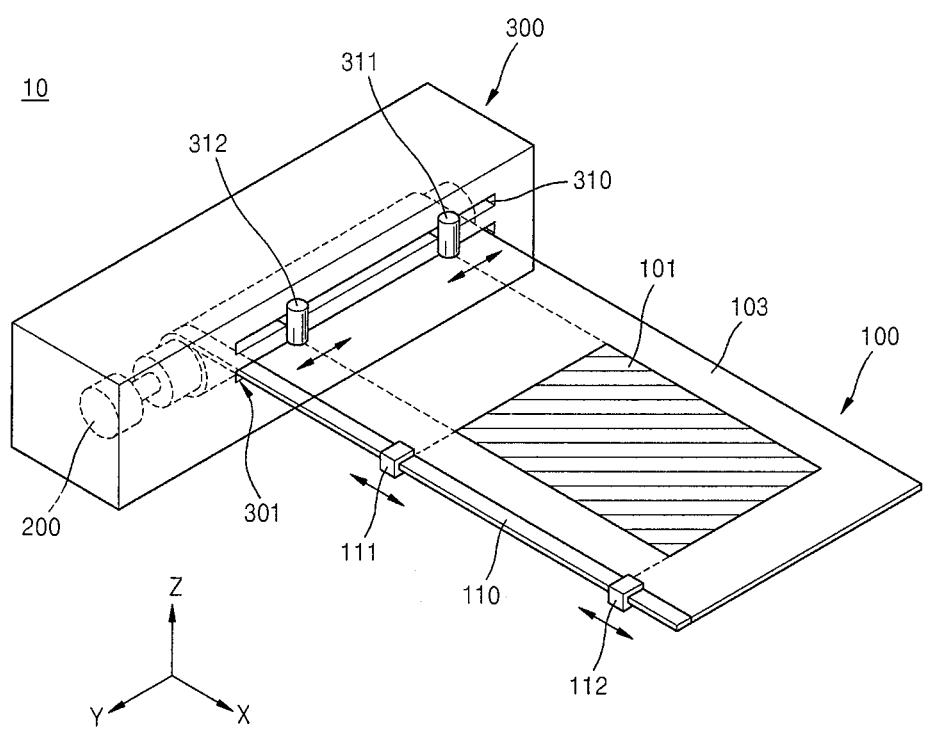
FIG. 1 a schematic perspective view of a display device according to an embodiment of the present invention.

The present general inventive concept will now be described more fully with reference to the accompanying drawings, in which embodiments of the present general inventive concept are shown. Like reference numerals refer to like elements throughout, and repeated descriptions thereof are omitted herein. Sizes of elements may be exaggerated for clarity and convenience of explanation. The present embodiments are illustrated by way of examples only, and the embodiments may have different forms, and should not be construed as being limited to the descriptions set forth herein.

While the terms such as "first" and "second" may be used to describe various components, such components are not limited to the above terms. Further, the terms used in the present application are merely used to describe an embodiment, and are not intended to limit the present invention. Use of singular forms includes plural references as well unless expressly specified otherwise. The terms "comprising", "including", and "having" specify the presence of components, steps, operations, and/or elements, but do not preclude the presence or addition of one or more components, steps, operations, and/or elements. The terms are used only to distinguish one component from another. Expressions such as "at least one of," when preceding a list of elements, modify the entire list of elements, and do not modify the individual elements of the list.

Further, the use of "may" when describing embodiments of the present invention refers to "one or more embodiments of the present invention." In a similar fashion, the use of example language, such as "for example," "such as," and "e.g." when describing embodiments of the present invention refers to "one or more embodiments of the present invention" for each of the corresponding items listed. In addition, the use of alternate language, such as "or," when describing embodiments of the present invention refers to "one or more embodiments of the present invention" for each corresponding item listed, while "and/or" refers to "one or more embodiments of the present invention" for every combination of one or more of the corresponding items listed.

Figure 2A:
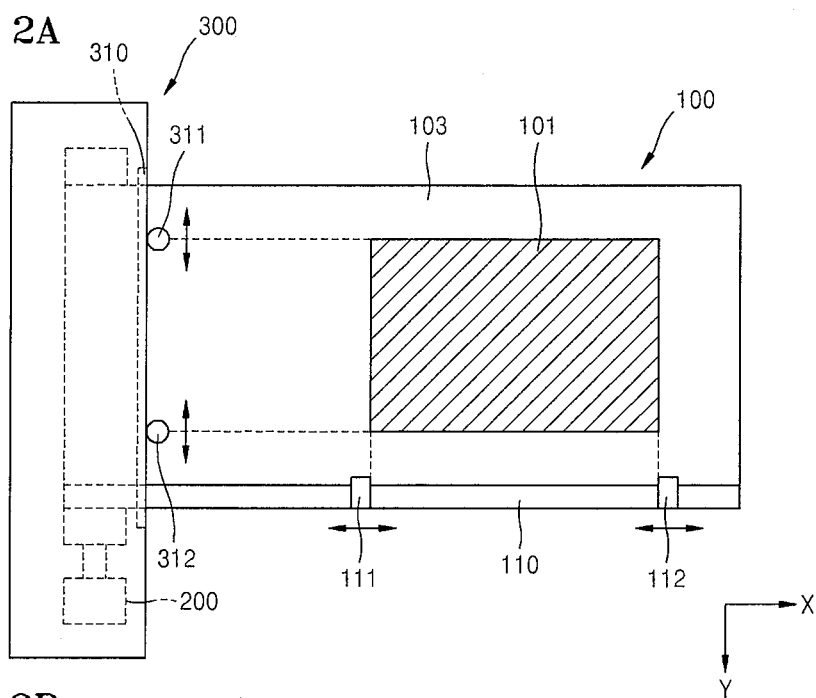
FIGS. 2A and 2B are top views of the display device of FIG. 1 in which a display region is selected by first through fourth position selectors.
Figure 2B:
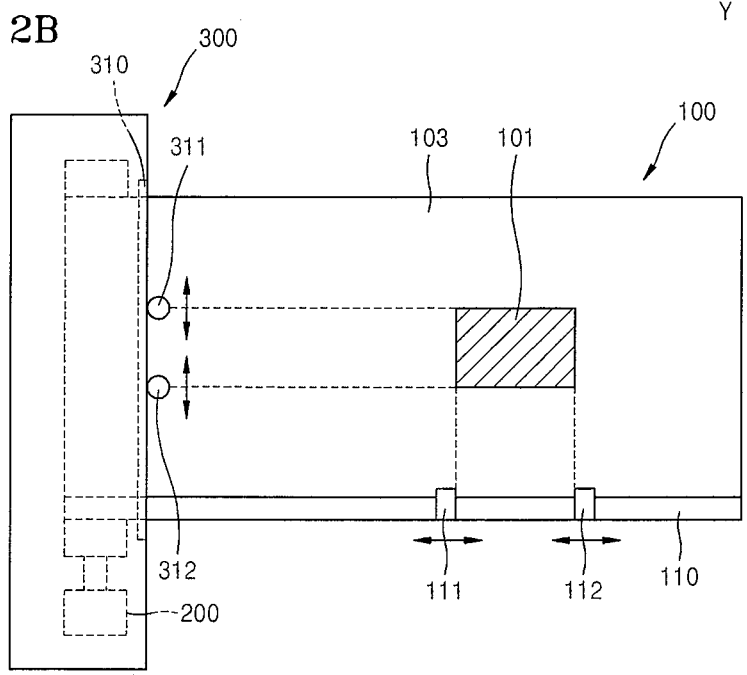

FIG. 1 is a schematic perspective view of a display device 10 according to an embodiment of the present invention. FIGS. 2A and 2B are top views of the display device 10 of FIG. 1 illustrating determination/selection of an activation region on a display panel 100.

Referring to FIGS. 1, 2A, and 2B, the display device 10 includes the display panel 100, a cylindrical jig 200, and a housing 300.

The display panel 100 displays an image being processed in the display device 10. For example, when the display device 10 is a handheld computer, the display panel 100 may display an image of a user interface (UI) or a graphical user interface (GUI) of the handheld computer.

The display panel 100 includes first and second position selectors 111 and 112, which are located on a side edge thereof, and which are parallel to each other in a first direction (e.g., X-axis direction in FIGS. 1, 2A, and 2B). The display panel 100 also includes third and fourth position selectors 311 and 312, which are located thereon, and which are parallel to each other along a second direction (e.g., Y-axis direction in FIGS. 1, 2A, and 3B).

Positions of the first and second position selectors 111 and 112 and the third and fourth position selectors 311 and 312 may determine an activated region 101 and a deactivated region 103. The activated and deactivated regions 101 and 103 may be defined as regions where the display panel 100 is turned on and off, respectively. However, the present invention is not limited thereto, and the activated region 101 may instead be defined as a region on the display panel 100 that is brighter than the deactivated region 103.

The first and second position selectors 111 and 112 are movable in the first direction and a direction opposite to the first direction (e.g., along the X-axis in FIG. 1) while the third and fourth position selectors 311 and 312 are movable in the second direction and a direction opposite to the second direction (e.g., along the Y-axis in FIG. 1). A first movement member 110 is located along the side edge of the display panel 100 to guide movement of the first and second position selectors 111 and 112. A second movement member 310 is located at one side of the housing 300 to guide movement of the third and fourth position selectors 311 and 312.

A length of the activated region 101 along the first (X-axis) direction may be determined by the first and second position selectors 111 and 112. A length of the activated region 101 along the second (Y-axis) direction may be determined by the third and fourth position selectors 311 and 312. As shown in FIGS. 2A and 2B, an area of the activated region 101 may be controlled by adjusting the positions of the first through fourth position selectors 111, 112, 311, and 312.

To achieve this, the display panel 100 includes a plurality of first sensing lines (121 in FIG. 3) and a plurality of second sensing lines (122 in FIG. 3) for determining the extent of the activated region 101. The display panel 100 may include the plurality of first sensing lines 121 that extend in the first (X-axis) direction, and the plurality of second sensing lines 122 that extend in the second (Y-axis) direction.

Thus, the activated region 101 may be determined by interactions among the first through fourth position selectors 111, 112, 311, and 312 and the plurality of first and second sensing lines 121 and 122. A mechanism for determining the activated region 101 will be described in more detail below with reference to FIGS. 3 and 4.

In some embodiments of the present invention, the plurality of first and second sensing lines 121 and 122 may be sensors for detecting variations in capacitance. In this case, when the first through fourth position selectors 111, 112, 311, and 312 are located on the plurality of first and second sensing lines 121 and 122, a change in capacitance enables the positions of the first through fourth selectors 111, 112, 311, and 312 to be detected.

In other embodiments of the present invention, the plurality of first and second sensing lines 121 and 122 may be sensors for detecting a variation in pressure. In this case, when the first through fourth position selectors 111, 112, 311, and 312 apply pressure to the plurality of first and second sensing lines 121 and 122, a variation in pressure enables the positions of the first through fourth position selectors 111, 112, 311, and 314 to be detected.

In another embodiment of the present invention, each of the first through fourth position selectors 111, 112, 311, and 312 may include a conductive material. In another embodiment of the present invention, the first through fourth position selectors 111, 112, 311, and 312 may contact a surface of the display panel 100.

In another embodiment of the present invention, the first and second position selectors 111 and 112 are ⊏-shaped, and are located over top and bottom surfaces of the display panel 100. The first and second position selectors 111 and 112 may move along the first movement member 110 like a zipper slider, thereby facilitating user manipulation. The third and fourth position selectors 311 and 312 may have a cylindrical shape.

The display panel 100 may include a plurality of liquid crystal cells or a plurality of organic light-emitting elements. The display panel 100 may be flexible or rollable, and/or transparent or light-transmissive.

In addition to the plurality of first and second sensing lines 121 and 122, a touch sensor may be located on the display panel 100 to detect a touch. The touch sensor may be a touch film, touch sheet, or touch panel. However, the present invention is not limited thereto, and the plurality of first and second sensing lines 121 and 122 may also detect a touch within the activated region 101. The display panel 100 is coupled to a controller, and may display an image in response to a signal received from the controller.

The display panel 100 may further include a flexible battery, which has an ultra-thin rollable structure for flexibility or pliability. However, the present invention is not limited thereto, and the display panel 100 may be supplied with power by a separate power supply instead of the flexible battery.

The display panel 100 having the above-described configuration is wrapped around the cylindrical jig 200 for easy keeping/storage, so that the rollable display device 10 may be small-sized and easy to carry. The cylindrical jig 200 is mounted within the housing 300 such that it can rotate around an axis of a cylinder. The housing 300 may further include an internal coupling member for coupling the cylindrical jig 200 with the housing 300 so that the cylindrical jig 200 can rotate about the center/axis of a cylinder. Furthermore, the cylindrical jig 200 may be coupled to an external manipulator for causing rotation of the cylindrical jig 200.

The housing 300 encloses the cylindrical jig 200 around which the display panel 200 is wound and protects the display panel from external shock.

The housing 300 has a hole 301 in one side thereof, through which a portion of the display panel 100 rolls out. Furthermore, as described above, the housing 300 also has the second movement member 310 located at one side thereof, along which the third and fourth position selectors 311 and 312 can move. The second movement member 310 may enable longitudinally adjusting the positions of the third and fourth position selectors 311 and 312. The positions of the third and fourth position selectors 311 and 312 may be adjusted so that they may contact, or may be close to, the display panel 100.

The above-described display device 10 is configured to determine the activated region 101 of the display panel 100 by using the first through fourth position selectors 111, 112, 311, and 312, thereby allowing the user to turn on only a desired display region, thereby reducing overall power consumption of the display device 10.

Figure 3:
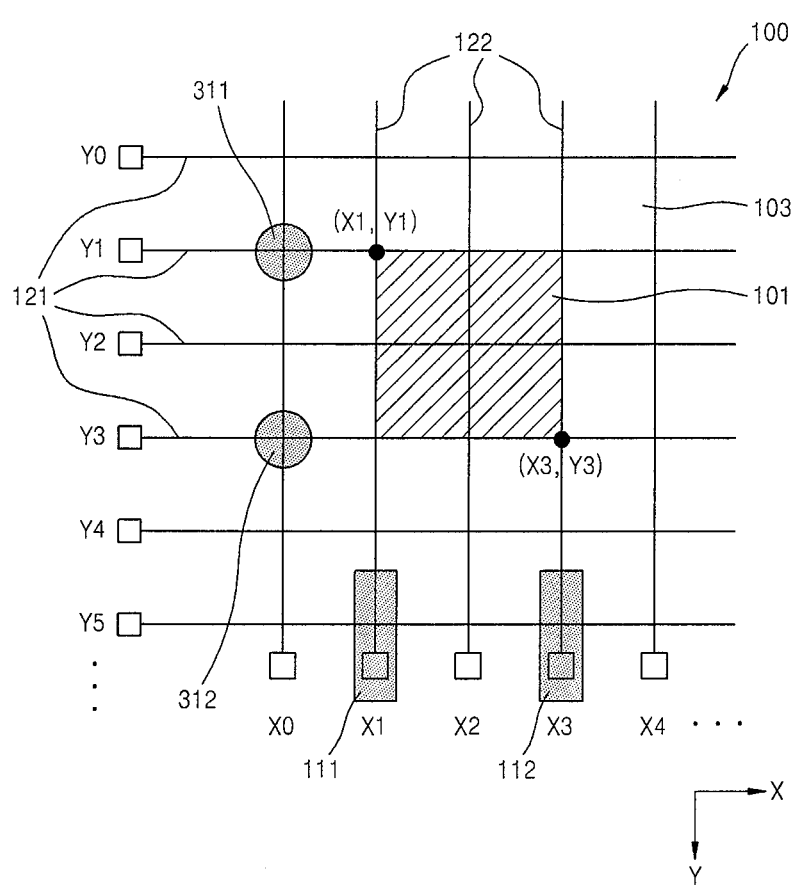
FIG. 3 illustrates an example of a mechanism for selecting an activated region in a display device according to an embodiment of the present invention.

FIG. 3 illustrates an example of a mechanism for selecting an activated region 101 in the display device 10.

Referring to FIG. 3, the display panel 100 includes the plurality of first sensing lines 121 that extend in a first direction (e.g., X-axis direction) and the plurality of second sensing lines 122 that extend in a second direction (e.g., Y-axis direction). The plurality of first sensing lines 121 may be parallel to each other and spaced apart in the second/Y-axis direction, and the plurality of second sensing lines 122 may be parallel to each other and spaced apart in the first/X-axis direction.

Each of the first and second position selectors 111 and 112 may select one of the plurality of second sensing lines 122 to collectively determine coordinates Xa and Xb in the first (X-axis) direction of the display panel 100 (e.g., X1 and X3 in FIG. 3).

More specifically, the plurality of second sensing lines 122 are parallel and next to one another in the first (X-axis) direction so as to represent coordinates in the first (X-axis) direction (i.e., X0, X1, X2, X3, X4 . . . in FIG. 3). For example, the first position selector 111 selects one of the plurality of second sensing lines 122 corresponding to a coordinate Xa. Referring to FIG. 3, in the present example, the determined coordinate Xa is X1. The second position selector 112 may select one of the plurality of second sensing lines 122 corresponding to a different coordinate Xb. Referring to FIG. 3, in the present example, the determined coordinate Xb is X3.

Similarly, each of the third and fourth position selectors 311 and 312 may each select one of the plurality of first sensing lines 121 to respectively determine coordinates Ya and Yb in the second (Y-axis) direction of the display panel 100 (e.g., Y1 and Y3 in FIG. 3).

More specifically, the plurality of first sensing lines 121 are parallel and arranged next to one another in the second (Y-axis) direction to represent coordinates in the second (Y-axis) direction (i.e., Y0, Y1, Y2, Y3, Y4, Y5 . . . in FIG. 3). The third position selector 311 selects one of the first sensing lines 121 corresponding to a coordinate Ya (in the present example, the determined coordinate Ya is Y1 of FIG. 3). The second position selector 312 may select one of the first sensing lines 121 corresponding to a coordinate Yb (in the present example, the determined coordinate Yb is Y3, as shown in FIG. 3).

The coordinates Xa, Xb, Ya, and Yb respectively selected by the first through fourth position selectors 111, 112, 311, and 312 as described above are combined to represent four coordinates (Xa, Ya), (Xa, Yb), (Xb, Ya), and (Xb, Yb). A region inside a closed curve, or box, formed by connecting the four coordinates (Xa, Ya), (Xa, Yb), (Xb, Ya), and (Xb, Yb) may be determined as the activated region 101.

In FIG. 3, a region inside a closed curve formed by connecting the coordinates (X1, Y1), (X1, Y3), (X3, Y1), and (X3, Y3) is the activated region 101.

Figure 4:
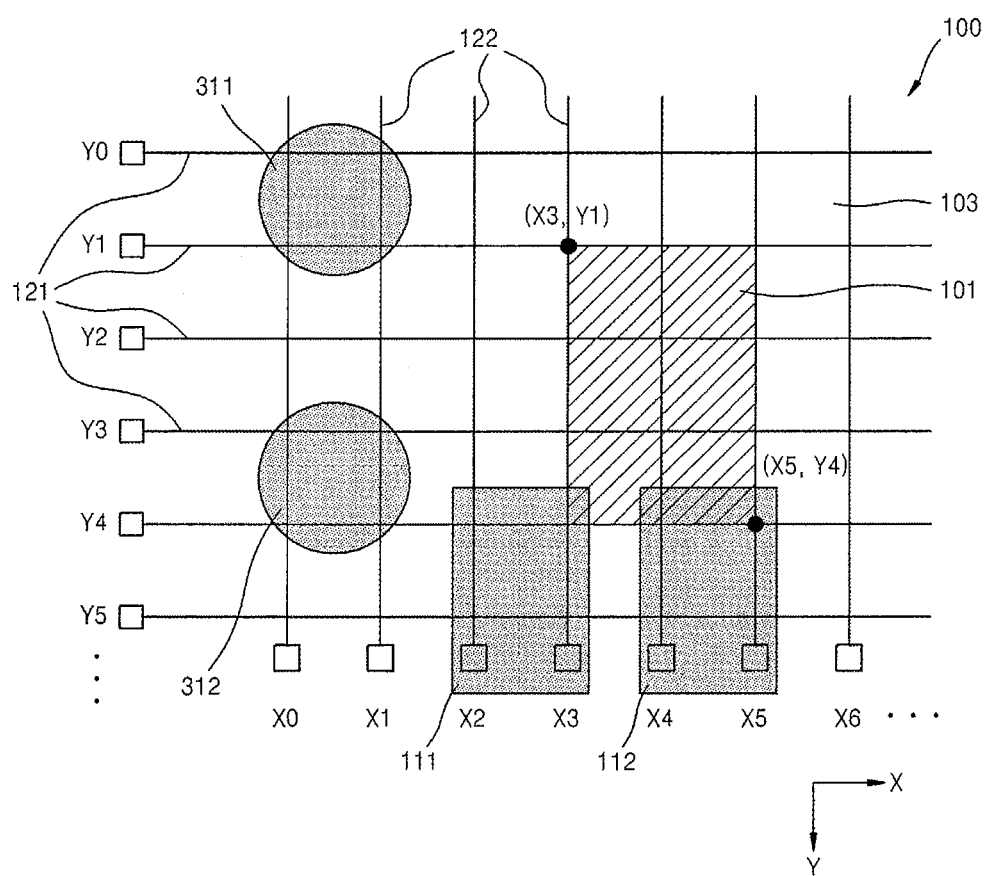
FIG. 4 illustrates another example of a mechanism for selecting an activated region in a display device according to a different embodiment of the present invention.

FIG. 4 illustrates another example of a mechanism for selecting an activated region 101 in a display device according to an embodiment of the present invention. The same reference numerals in FIG. 3 refer to the same elements, and their detailed descriptions will not be repeated to simplify explanation.

Referring to FIG. 4, each of the first through fourth position selectors 111, 112, 311, and 312 is located over several of the plurality of first and second sensing lines 121 and 122. In the present embodiment, the activated region 101 may be determined in various ways.

For example, when each of the first and second position selectors 111 and 112 may be individually located over two or more second sensing lines 122, the largest (e.g., rightmost) coordinate is determined as an X-coordinate for determining the activated region 101. More specifically, referring to FIG. 4, although the first position selector 111 is located over two sensing lines corresponding to X2 and X3, the first position selector 111 selects the larger coordinate X3 as a coordinate Xa for determining the activated region 101. The second position selector 112 located over two sensing lines respectively corresponding to X4 and X5 may select the larger coordinate X5 as a coordinate Xb for determining the activated region 101.

In the same manner, the third and fourth position selectors 311 and 312 may each select a largest one (e.g., lowermost) of the coordinates corresponding to respective first sensing lines 121, over which the third and fourth position selectors 311 and 312 are located, as a coordinate of the activated region 101.

Thus, the activated region 101 shown in FIG. 4 may be located inside a box/closed curve formed by connecting coordinates (X3,Y1), (X3,Y4), (X5,Y1), and (X5,Y4). However, a method of determining the coordinates of the activated region 101 is not limited thereto, and various changes may be made thereto.

Figure 5:
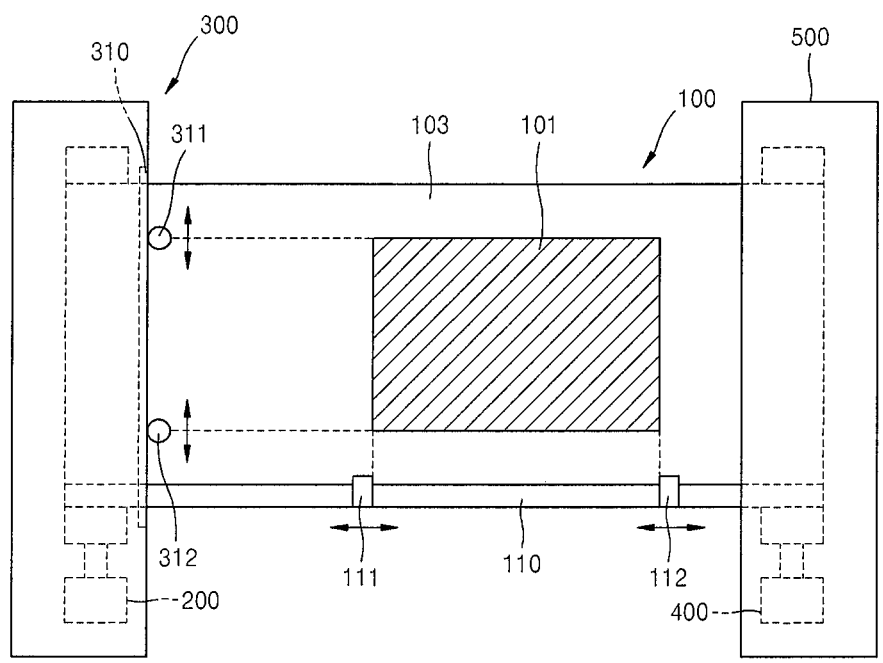
FIG. 5 is a schematic plan view of a display device according to another embodiment of the present invention.

FIG. 5 is a schematic plan view of a display device 20 according to another embodiment of the present invention. The same reference numerals in FIG. 1 refer to the same elements, and their detailed descriptions will not be repeated for convenience of description.

Referring to FIG. 5, the display device 20 is different from the display device 10 of FIG. 1 in that it further includes an additional housing 500 and an additional cylindrical jig 400.

The display device 20 includes the housing 300 located on one side of the display panel 100, and also includes the additional housing 500 on the other side of the display panel 100. The additional housing 500 protects the display panel 100 that is wrapped around the cylindrical jig 200, and facilitates the roll-out of the display panel 100. The additional housing 500 also has a hole through which a portion of the display panel 100 rolls out.

The additional cylindrical jig 400 is located within the additional housing 500. The display panel 100 may be wrapped around the additional cylindrical jig 400. The additional housing 500 may further include an internal coupling member for coupling the additional cylindrical jig 400 with the additional housing 500 so that the additional cylindrical jig 400 can rotate about a center of a cylinder as an axis. The additional cylindrical jig 400 may also be coupled to an external manipulator (not shown) for rotation.

Due to the presence of the additional housing 500 and the additional cylindrical jig 400, the display panel 100 in the display device 20 may be easier to keep and carry.

While embodiments of the present invention have been particularly shown and described with reference to exemplary embodiments thereof to aid in the understanding thereof, it will be understood by those of ordinary skill in the art that the exemplary embodiments described therein should be not considered for purposes of limitation, and the present invention should be construed as including all the changes, equivalents, and substitutions included in the spirit and scope thereof.

What is claimed is:

1. A display device comprising:
a display panel comprising a plurality of first sensing lines that extend in a first direction, and a plurality of second sensing lines that extend in a second direction;
a first position selector and a second position selector at an edge of the display panel, and spaced apart from each other in the first direction; and
a third position selector and a fourth position selector at or above the display panel, and spaced apart from each other in the second direction,
wherein an activated region of the display panel corresponds to respective positions of the first position selector, the second position selector, the third position selector, and the fourth position selector.

2. The display device of claim 1, wherein a length of the activated region in the first direction corresponds to a first position of the first position selector and a second position of the second position selector.

3. The display device of claim 1, wherein a length of the activated region in the second direction corresponds to a third position of the third position selector and a fourth position of the fourth position selector.

4. The display device of claim 1, wherein the first position selector and the second position selector are each configured to select one of the second sensing lines, and are respectively configured to determine an Xa coordinate and an Xb coordinate, the Xa and Xb coordinates corresponding to the first direction of the display panel,
wherein the third position selector and the fourth position selector are each configured to select one of the first sensing lines, and are respectively configured to determine a Ya coordinate and a Yb coordinate, the Ya and Yb coordinates corresponding to the second direction of the display panel, and
wherein the activated region corresponds to coordinate pairs (Xa, Ya), (Xa, Yb), (Xb, Ya), and (Xb, Yb).

5. The display device of claim 1, wherein the first position selector and the second position selector are movable in the first direction, and
wherein the third position selector and the fourth position selectors are movable in the second direction.

6. The display device of claim 1, wherein the display panel is flexible.

7. The display device of claim 1, wherein the first direction is perpendicular to the second direction.

8. The display device of claim 1, wherein the first position selector, the second position selector, the third position selector, and the fourth position selector each comprise a conductive material.

9. The display device of claim 1, wherein the plurality of first sensing lines and the plurality of second sensing lines are configured to detect variations in capacitance.

10. The display device of claim 1, wherein a first movement member is located at the edge of the display panel to guide movement of the first position selector and the second position selector.

11. A display device comprising:
a display panel comprising a plurality of first sensing lines that extend in a first direction, and a plurality of second sensing lines that extend in a second direction;
a first position selector and a second position selector at an edge of the display panel, and spaced apart from each other in the first direction;
a third position selector and a fourth position selector at or above the display panel, and spaced apart from other in the second direction;
a cylindrical jig configured to wind and unwind the display panel; and
a housing in which the cylindrical jig is mounted, the housing defining a hole through which at least a portion of the display panel is configured to pass,
wherein an activated region of the display panel corresponds to respective positions of the first position selector, the second position selector, the third position selector, and the fourth position selector.

12. The display device of claim 11, wherein the housing comprises a second movement member for guiding movement of the third position selector and the fourth position selector in the second direction.

13. The display device of claim 11, wherein a length of the activated region in the first direction corresponds to a first position of the first position selector and a second position of the second position selector.

14. The display device of claim 11, wherein a length of the activated region in the second direction corresponds to a third position of the third position selector and a fourth position of the fourth position selector.

15. The display device of claim 11, wherein the first position selector and the second position selector are configured to select one of the second sensing lines, and are configured to respectively determine an Xa coordinate and an Xb coordinate corresponding to the first direction of the display panel,
wherein the third position selector and the fourth position selector are configured to select one of the first sensing lines, and are configured to respectively determine a Ya coordinate and a Yb coordinate corresponding to the second direction of the display panel, and
wherein the activated region corresponds to pairs of the coordinates (Xa, Ya), (Xa, Yb), (Xb, Ya), and (Xb, Yb).

16. The display device of claim 11, wherein the first position selector and the second position selector are movable in the first direction, and
wherein the third position selector and the fourth position selector are movable in the second direction.

17. The display device of claim 11, wherein the first direction is perpendicular to the second direction.

18. The display device of claim 11, wherein the first position selector, the second position selector, the third position selector, and the fourth position selector each comprise a conductive material.

19. The display device of claim 11, wherein the plurality of first sensing lines and the plurality of second sensing lines are configured to detect variations in capacitance.

20. The display device of claim 11, wherein a first movement member is located at the edge of the display panel to guide the first position selector and the second position selector.

21. The display device of claim 11, wherein the first position selector and the second position selector are ⊏-shaped, and are located over a top surface and below a bottom surface of the display panel.

22. The display device of claim 11, wherein the third position selector and the fourth position selector are cylindrically shaped.

* * * * *